United States Patent Office 3,472,069
Patented Oct. 14, 1969

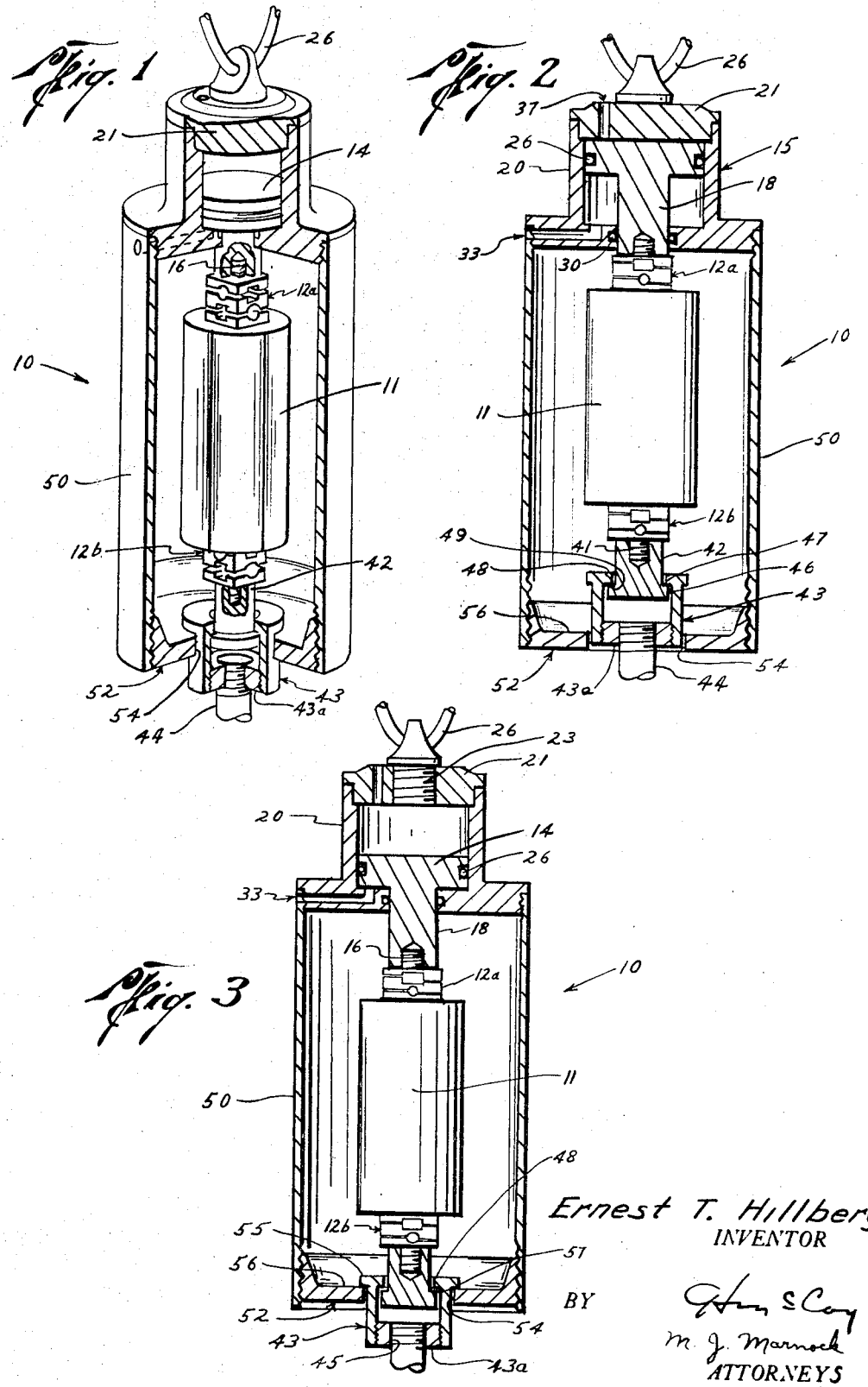

3,472,069
LOAD RELIEVING DEVICE
James E. Webb, Administrator of the National Aeronautics and Space Administration, with respect to an invention of Ernest T. Hillberg, La Habra, Calif.
Filed Dec. 7, 1967, Ser. No. 688,742
Int. Cl. G01l 5/12; G01g 3/14
U.S. Cl. 73—141                                         4 Claims

ABSTRACT OF THE DISCLOSURE

A load relieving device for transferring the load from a load cell to a bypass mechanism so as to remove all weight from the load cell between load readings. The load cell at its upper end is joined by a flexible coupling to the piston shaft of a fluid-drive piston and cylinder arrangement, the cylinder of which is directly attachable to an overhead support for supporting the device. The lower end of the load cell is connectable to the load via a flexible coupling and a load transfer member. When the piston is driven to an upper operative position by an application of fluid pressure the load cell is active in support of the load. When the pressure is withdrawn the piston moves to a lower inoperative position in which the load transfer member is engaged by a load bypass mechanism affixed to the cylinder to thereby transfer the load from the load cell to the load bypass mechanism.

---

The invention described herein was made in the performance of work under a NASA contract and is subject to the provision of Section 305 of the National Aeronautics and Space Act of 1958, Public Law 85–568 (72 Stat. 435; 42 U.S.C. 2457).

BACKGROUND OF THE INVENTION

This invention relates to a load cell protection device, and more particularly to a device for temporarily relieving the load from a load cell between successive applications.

As is known in the art, a load cell is a load or thrust measuring mechanism usually in the form of a high-strength metal column to which a plurality of strain gages are bonded. The gages are electrically connectable in a bridge circuit whereby the imposition of a load on the metal column with distortion of the strain gages results in changes in their electrical resistances and an output voltage which varies proportionally with the load.

In the application of a load cell for determining center of gravity location of a spacecraft, as by the tension-weighing method, for example, it is necessary to perform a series of separate, independent weighings with precision relative to a known datum line. In order to obtain true readings the load induced into the load cell must be reduced to zero before each weighing. It is also necessary to protect the load cell from detrimental loads induced during handling operations. In the past these aims have been accomplished by physically removing the cell from the system, or alternatively, by raising up the load from the load cell after each load reading. The latter method, however, is only partially effective in that the weight of slings, coupling devices, and the like, remains imposed on the cell.

The present invention which is directed to a solution of these problems is a load relieving device which can be used during handling operations to transfer the load from the load cell to a bypass mechanism and to remove all weight from the load cell between successive load measurements. The load cell itself is provided at each end with a flexible coupling member, the upper one being joined to the piston shaft of a hydraulic or pneumatic piston and cylinder arrangement. The cylinder, which also constitutes part of a load bypass mechanism, is provided with means for attaching the apparatus to an overhead support. The lower flexible coupling is connectable to the load via a load transfer member. When the piston is driven to an upper operative position by an application of fluid pressure from a suitable source, the load cell and load transfer member are active in support of the load. However, when the pressure is withdrawn the piston assumes a lower inoperative position by gravitational force or the biasing action of a piston return spring, in which position the load transfer member cooperatively engages a load bypass member affixed to the cylinder and transfers the load from the load cell to the bypass mechanism.

BRIEF DESCRIPTION OF THE DRAWINGS

The invention will be better understood by referring to the drawings in which like numerals identify like parts in the different figures, and in which:

FIG. 1 is a perspective view, partly in section, showing the load relieving device of this invention;

FIG. 2 is a longitudinal sectional view of the invention showing the device in the condition in which the load cell is active in support of the load; and FIG. 3 is a section view showing the device in the condition in which the load is removed from the load cell and supported by the load bypass mechanism of the invention.

DESCRIPTION OF THE PREFERRED EMBODIMENT

Referring more particularly to the drawings, the device 10, as shown in FIG. 1, is designed for use with a load cell 11 of a conventional type which comprises a high-strength metal column to the wall of which are bonded a plurality of strain gages. For the sake of clarity, the gages are not shown, and it is to be understood that, as is conventional, the gages are electrically connectable whereby distortion of the gage wire associated with the imposition of a load on the cell effects a change in the electrical resistances of the gages to produce an output voltage proportional to the load.

At its ends the load cell is fitted with flexible coupling members 12a, 12b for eliminating extraneous signals which might be induced through the redundancy of attachments to the cell. The members 12a, 12b are friction-less type flexure pivots as are well known in the art, and "Compound Mono Flexures" manufactured by Ormond, Inc. of Santa Fe Springs, Calif. might be suitably employed. The upper flexible coupling 12a is directly connected to the piston 14 of a piston and cylinder arrangement 15. For this purpose the flexible coupling 12a is provided at its top with a threaded stud 16 which is received in a threaded axial bore 17 in the end of the piston shaft 18 and provides connection therewith.

The piston 14 is movable within the cylinder member 20 which is closed at its upper end by a cylinder head 21. The cylinder head may be integrally formed with the cylinder member 20, or, as shown in the drawing, may be threadedly connected thereto by cooperating threads on the periphery of the cylinder head and the internal wall of the cylinder. A central stud 23 provided with an eye 24 is also secured to the cylinder head 21 by threaded connection with the threads of an axial bore 25 provided in the cylinder head. The eye 24 provides means for receiving a cable 26 or other attachment means for tying the device 10 to a suitable support such as an overhead beam, or the like.

At the lower end of the cylinder member 20 is provided a transverse end wall 27 which is preferably integrally formed with the cylinder 20 and includes a central opening 29 for receiving the piston shaft therethrough. An O-ring 30 seated in an annular groove in the wall of the opening 29 provides a seal between the piston shaft and the cylinder end wall.

The end wall 27 of the cylinder is also provided with a flow passage 33 which extends radially from the peripheral edge of the wall and then upwardly to communicate with the interior of the cylinder 20. At its opening in the edge of the wall 27, the bore which defines the passage 33 is threaded for receiving a suitable fitting whereby a controllable source of hydraulic or pneumatic pressure (not shown) may be connected thereto to drive the piston 14 upwardly upon operation of a suitable control valve means for selectively communicating fluid pressure to the cylinder and relieving the pressure therein. For this purpose the piston is provided with a circumferential groove and an O-ring 26 therein which provides a fluid-tight seal with the inner wall of the cylinder. A pressure relief port 37 in the cylinder head 21 facilitates upward piston movement, and either gravity or a helically coiled spring between the cylinder head and the piston may be used to return the piston to its lower position in the cylinder when fluid pressure is withdrawn.

The load cell 11 is connectable to a load in the following manner. The flexible coupling 12b at the lower end of the cell is provided with a threaded stud 41 which is affixed to the lower end of the flexible coupling 12b and received in an axial threaded bore in a coupling rod 42. The lower end of the coupling rod 42 is received in the hollow bore of a cup-like load transfer member 43 and forms a lost-motion coupling therewith. The load to be measured is directly connectable to the load transfer member 43 by an appropriate fitting 44 which may be threaded into an axial bore 45 formed in the base 43a of the load transfer member.

For its coupling to the load transfer member, the coupling rod 42 is formed with a radial flange 46 at its lower end which provides an upward facing shoulder 47. The load transfer member 43 at its open upper end is formed with an internal annular flange 48 which forms a downward facing shoulder 49 and defines an opening smaller than the diameter of the radial flange 46 on the coupling rod 42. Consequently, the internal flange 48 of the load transfer member is adapted to seat against the upward facing shoulder 47 provided by the flange 46 of the coupling rod. It is therefore readily apparent that the coupling rod 42 is permitted a limited axial movement within the bore of the load transfer member 42 and is adapted to lift the load transfer member and a load attached thereto whenever the piston is driven upwardly by application of fluid pressure to the cylinder 20.

The load bypass mechanism of the device 10 includes a load bypass member 50 which is preferably in the form of a cylinder threadely connected to the end wall 27 of the cylinder 20 and substantially enclosing the load cell 11. At its lower end the bypass member 50 is provided with a transverse end plate 52 which is threaded to the bottom end of the cylindrical bypass member 50 and is adjustable in the axial direction relative thereto. The end plate 52 receives the load transfer member 43 in a central circular opening 54 which is of slightly less diameter than the diameter of an external radial flange 55 provided at the upper open end of the load transfer member. Consequently, the upward facing surface 56 of the end plate 52 is adapted to engage the downward facing shoulder 57 provided by the flange 55 of the load transfer member 43 whenever the load transfer is in a lowered position as shown in FIG. 3. In this condition, in which the piston has been lowered by the removal of fluid pressure from the pressure source, the coupling rod 42 is disengaged from the load transfer member 43, and the load cell is no longer active in support of the load. The load instead is carried by the load transfer member 43, the end plate 52, the cylindrical load bypass member 50, and the cylinder 20.

It will therefore be readily seen that the present invention is a load relieving device which can be quickly used by pneumatic or hydraulic control means to transfer the load from a load cell to a load bypass mechanism. The invention can be used with a wide variety of commercially available load cell devices, and it will also be seen that various modifications may be made in the device 10 without affecting its operation. The load bypass member 50, for example, need not be of cylindrical form and need not envelop the load cell 11, as shown. However, in its cylindrical form the load bypass member provides a measure of protection for the load cell and facilitates axial adjustment of the end plate 52 relative thereto.

The axial position of the end plate determines at what point during the downward stroke of the piston that the load transfer member transfers the load to the load bypass member. The adjustability of the end plate, of course, is a desirable feature if the device is to accommodate various sizes of flexible couplings or connecting rods of different lengths. For a short length of flexible coupling the end plate can be threaded inwardly of the cylinder 50 to insure engagement of the load transfer member with the end plate when the piston is in its lowermost position.

What is claimed and desired to be secured by Letters Patent is:

1. An apparatus for relieving the load from a load measuring mechanism, said apparatus comprising:
    piston and cylinder means including a cylinder and a piston within said cylinder, said piston and cylinder means being adapted to respond to a controllable fluid pressure means which is selectively communicable with said cylinder for raising said piston to an upper operative position and for lowering said piston to a lower inoperative position, said cylinder means being adaptable to an overhead support;
    means coupling the upper end of said load measuring mechanism to said piston whereby the load measuring mechanism is raised or lowered in correspondence with controlled movements of the piston;
    means coupling the lower end of said load measuring mechanism to a load whenever the piston is in its upper position whereby the load measuring mechanism actively supports said load;
    a load bypass member rigidly joined with said cylinder; and
    load transfer means for transferring support of said load from the load measuring mechanism to said load bypass member and said cylinder whenever the piston is in its lower inoperative position.

2. An apparatus as described in claim 1 wherein said means coupling the lower end of said load measuring mechanism to the load comprises
    a connecting rod having an upward facing shoulder means, said connecting rod being coupled to said loading measuring mechanism;
    a sleeve member mounted on said connecting rod for limited longitudinal movement relative thereto, said sleeve member adapted to be directly coupled to said load and including
        an internal downward facing shoulder means cooperatively engageable with said upward facing shoulder means on said connecting rod whenever the piston is in its upper position whereby said sleeve member and load are fully supported by said load measuring mechanism.

3. An apparatus as described in claim 2 wherein said load bypass member includes an upward facing shoulder means and said sleeve member is provided with an external shoulder means cooperatively engageable with the upward facing shoulder means on said load transfer member whenever the piston is in its lower position to thereby transfer support of the load from said load measuring mechanism to said load transfer member.

4. An apparatus as described in claim 3 further including a first flexible mounting means coupling said connecting rod to said load measuring mechanism, and second flexible mounting means coupling said load measuring mechanism to said piston.

References Cited

UNITED STATES PATENTS

| | | | |
|---|---|---|---|
| 2,472,047 | 5/1949 | Ruge | 73—141 |
| 3,258,300 | 6/1966 | Saunders | 73—141 XR |
| 3,355,938 | 12/1967 | Neely et al. | 73—141 |

FOREIGN PATENTS 967,813  8/1964  Great Britain.

CHARLES A. RUEHL, Primary Examiner

U.S. Cl. X.R.

177—211